United States Patent
Oyama

(10) Patent No.: US 7,934,094 B2
(45) Date of Patent: Apr. 26, 2011

(54) METHOD, SYSTEM AND APPARATUS TO SUPPORT MOBILE IP VERSION 6 SERVICES

(75) Inventor: Johnson Oyama, Tokyo (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 630 days.

(21) Appl. No.: 10/595,019

(22) PCT Filed: Jun. 15, 2004

(86) PCT No.: PCT/SE2004/000949
§ 371 (c)(1), (2), (4) Date: Dec. 16, 2005

(87) PCT Pub. No.: WO2004/112348
PCT Pub. Date: Dec. 23, 2004

(65) Prior Publication Data
US 2007/0124592 A1    May 31, 2007

Related U.S. Application Data

(60) Provisional application No. 60/479,156, filed on Jun. 18, 2003, provisional application No. 60/551,039, filed on Mar. 9, 2004.

(51) Int. Cl.
*H04L 9/32* (2006.01)
(52) U.S. Cl. ........ 713/168; 713/171; 713/153; 370/338; 370/389
(58) Field of Classification Search .................. 713/171
See application file for complete search history.

(56) References Cited

U.S. PATENT DOCUMENTS

| | | | |
|---|---|---|---|
| 6,973,086 B2 * | 12/2005 | Patil et al. | 370/392 |
| 7,079,499 B1 * | 7/2006 | Akhtar et al. | 370/310 |
| 7,458,095 B2 * | 11/2008 | Forsberg | 726/3 |
| 2002/0065785 A1 * | 5/2002 | Tsuda | 705/67 |

(Continued)

FOREIGN PATENT DOCUMENTS

WO    WO 03/024128 A    3/2003

OTHER PUBLICATIONS

Faccin et al., "Diameter Mobile IPv6 Application, draft-le-aaa-diameter-mobileopv6-03.txt." Internet Draft, XP015004098, Apr. 2003, pp. 1-29.*

(Continued)

*Primary Examiner* — Emmanuel L Moise
*Assistant Examiner* — Luu Pham

(57) ABSTRACT

For establishing a MIPv6 security association between the mobile node (10) roaming in a foreign network (20) and a home agent (36) and for simplifying MIPv6-related configuration, MIPv6-related information is transferred in an end-to-end procedure over an AAA infrastructure by means of an, preferably extended, authentication protocol. A preferred embodiment uses EAP as basis for the extended authentication protocol, creating EAP extensions by incorporating the MIPv6-related information as additional data in the EAP protocol stack, for example as EAP attributes in the EAP method layer of the EAP protocol stack or transferred in a generic container attribute on the EAP layer or the EAP method layer. A major advantage of the proposed MIPv6 authentication/authorization mechanism lies in the fact that it is transparent to the visited domain (20), allowing AAA client (22) and AAAv (24) to act as mere pass-through agents during the procedure.

25 Claims, 8 Drawing Sheets

U.S. PATENT DOCUMENTS

| | | | |
|---|---|---|---|
| 2002/0114469 A1* | 8/2002 | Faccin et al. | 380/270 |
| 2002/0120844 A1* | 8/2002 | Faccin et al. | 713/168 |
| 2002/0169966 A1* | 11/2002 | Nyman et al. | 713/182 |
| 2002/0199104 A1* | 12/2002 | Kakemizu et al. | 713/168 |
| 2003/0033518 A1* | 2/2003 | Faccin et al. | 713/153 |
| 2003/0039234 A1 | 2/2003 | Sharma et al. | |
| 2003/0142650 A1* | 7/2003 | Fan | 370/338 |
| 2003/0142673 A1* | 7/2003 | Patil et al. | 370/392 |
| 2003/0226017 A1* | 12/2003 | Palekar et al. | 713/168 |
| 2003/0226037 A1* | 12/2003 | Mak | 713/201 |
| 2004/0002337 A1* | 1/2004 | Wheeler et al. | 455/445 |
| 2004/0047348 A1* | 3/2004 | O'Neill | 370/389 |
| 2004/0098588 A1* | 5/2004 | Ohba et al. | 713/169 |
| 2005/0210251 A1* | 9/2005 | Nyberg et al. | 713/169 |
| 2006/0004643 A1* | 1/2006 | Stadelmann et al. | 705/34 |
| 2008/0081592 A1* | 4/2008 | Das et al. | 455/406 |
| 2008/0101291 A1* | 5/2008 | Jiang et al. | 370/331 |

OTHER PUBLICATIONS

Vollbrecht et al., "CFR 2905," 2000, The Internet Society, pp. 1-45.*

Mitton et al., "CFR 3127," 2001, The Internet Society, pp. 1-71.*

Aboba et al., "CFR 3579," 2003, The Internet Society, p. 1-39.*

Blunk, L.: "PPP Extensible Authentication Protocol (EAP) RFC 2284" RFC, Mar. 1, 1998, XP015008068 (whole document).

Faccin, M.S. et al.: "Diameter Mobile IPv6 Application, draft-le-aaa-diameter-mobileipv6-03,txt" Internet Draft, Apr. 1, 2003; XP015004098.

Faccin M.S. et al: "Diameter Mobile IPv6 Application, draft-le-aaa-diameter-mobileipv6-03.txt" Internet Draft, Apr. 1, 2003 XP015004098 IETF section 1-section 9.

Blunk L.: "PPP Extensible Authentication Protocol (EAP) RFC 2284" RFC, Mar. 1, 1998, XP015008068 IETF the whole document.

"Wireless IP Network Standard"—3GPP2 P. S0001-B Version 1.0. 0—Oct. 25, 2002.

Onsako et. al., "Suitable Authentication Method for Each User Connection Type with Mobile IP Adaptation", Shingaku;-giho. The Institute of Electronics, Information an Communication Engineers. vol. 101, No. 290 Sep. 6, 2001, p. 37-42, NS2001-100, IN2001-64, CS2001-61.

* cited by examiner

METHOD, SYSTEM AND APPARATUS TO SUPPORT MOBILE IP VERSION 6 SERVICES

This application claims the benefit of U.S. Provisional Application No. 60/479,156, filed on Jun. 18, 2003 and 60/551,039, filed on Mar. 9, 2004, the disclosure of which is fully incorporated herein by reference.

TECHNICAL FIELD

The present invention generally relates to mobile communications and in particular to support for Mobile IP version 6 services.

BACKGROUND

Mobile IP (MIP) allows a mobile node to change its point of attachment to the Internet with minimal service disruption. MIP in itself does not provide any specific support for mobility across different administrative domains, which limits the applicability of MIP in a large-scale commercial deployment.

The MIP version 6 (MIPv6) protocol [1] allows nodes to move within the Internet topology while maintaining reachability and on-going connections with correspondent nodes. In this context, each mobile node is always identified by its home address, regardless of its current point of attachment to the IPv6 Internet. While situated away from its home network, a mobile node is also associated with a care-of address, which provides information about the mobile node's current location. IPv6 packets addressed to the mobile node's home address are more or less transparently routed to its care-of address. The MIPv6 protocol enables IPv6 nodes to cache the binding of a mobile node's home address with its care-of address, and then send any packets destined for the mobile node to the care-of address. To this end, the mobile node sends so-called binding updates to its home agent (HA) and the correspondent nodes with which it is communicating every time it moves.

MIPv6 capable mobile nodes, such as cellular phones, laptops and other end-user equipment, can thus roam between networks that belong to their home service provider as well as others. Roaming in foreign networks is enabled as a result of the service level and roaming agreements that exist between operators. MIPv6 provides session continuity within a single administrative domain, but depends on the availability of an Authentication, Authorization and Accounting (AAA) infrastructure to provide its services across different administrative domains, i.e. when roaming outside the network administered by the home operator. One of the key AAA protocols that contribute to making this kind of a roaming mechanism possible is Diameter.

In addition, although Mobile IPv6 can be regarded as a complete mobility protocol, more and/or improved mechanisms that facilitate deployment of MIPv6 are still needed in order to enable large-scale deployment. Although these mechanisms would not be part of the actual MIPv6 protocol, efficient deployment of MIPv6 services would heavily depend on them. The deployment related mechanisms would deal with issues such as the initial configuration of a MIPv6 enabled mobile node (MN), including configuration data such as the home network prefix or the home address, the home agent address, and the required IPsec SAs or security parameters on which dynamically established IPsec SAs can be based. One approach for the deployment related mechanisms is to leverage the existing AAA infrastructure.

In [2], for example, attempts are made to specify a new application to Diameter facilitating MIPv6 roaming in networks other than the home domain. This document identifies information that typically needs to be exchanged between a MN and an AAA Client in the network—MIP Feature Data, EAP Data, Security Key Data, and Embedded Data. It also proposes use of the new Diameter application in exchanges of this information between AAA Client and AAAv (the visited AAA server), between AAAv and AAAh (the home AAA server) and between HA and the AAA infrastructure. Although [2] does not specify any particular mechanism for communication between the mobile node and the AAA Client, the possibility to use the PANA protocol [3] is mentioned. However, the PANA WG has defined the scope of PANA such that it would not be able to transport the mentioned MIPv6-related information, which makes this solution unsatisfactory and non-complete.

Another drawback of the solution in [2] is that it requires the AAA Client (and AAAv) to understand the authentication method and be aware of the contents of the exchanges (MIP Feature Data, EAP Data, Security Key Data, and Embedded Data) between the MN and the AAAh. With such a solution it is not possible to apply prior encryption between MN and AAAh and the exchanges will be visible over the air interface. Security against eavesdropping, man-in-the-middle and other attacks is likely to be compromised.

Yet another drawback of the solution in [2] is that it requires support for the mechanisms both in the access network and in the AAAv. This may hamper deployment of the solution, since an operator that wants to use it depends on roaming partners to upgrade their networks to support the solution.

Accordingly, conventional mobility solutions are associated with several drawbacks and the need for a satisfactory mechanism supporting MIPv6 remains.

SUMMARY

A general object of the present invention is to provide an improved mechanism for authentication and authorization support of MIPv6. A specific object is to facilitate roaming in foreign networks with MIPv6 while maintaining high security. Another object is to facilitate deployment of MIPv6 by simplifying the configuration of the mobile node and the home agent. Still other objects are to provide a mechanism for MIPv6 support that is complete as well as transparent to the visited domain.

Briefly, the method of the present invention achieves authentication and authorization support for MIPv6 by transferring MIPv6-related information in an end-to-end procedure over an AAA infrastructure between a mobile node visiting a foreign network and the home network of the mobile node. The MIPv6-related information normally comprises authentication, authorization and/or and configuration information transferred over the AAA infrastructure for simplifying configuration of the mobile node and the home agent or establishing a MIPv6 security association between the mobile node and a home agent located either in the home network or in the visited network. The end-to-end feature is accomplished by means of an authentication protocol carried over the AAA infrastructure. The authentication protocol is preferably an extended authentication protocol but entirely newly defined protocols can also be used.

A preferred embodiment of the invention uses the Extensible Authentication Protocol (EAP) as basis for the extended authentication protocol, creating EAP extensions while typically keeping the EAP lower layer(s) intact. This normally means that the MIPv6-related information is incorporated as additional data in the EAP protocol stack, for example as EAP attributes in the EAP method layer of the EAP protocol stack or transferred in a generic container on the EAP layer or the EAP method layer.

By means of the present invention, a complete MIPv6 AAA solution is achieved for the first time, while in the prior art there have only been partial solutions non-consistent with each other. Moreover, relying on authentication protocol extensions like EAP extensions provides a streamlined solution, which is manageable and elegant with a minimum of backward compatibility problems. The use of EAP allows the AAA Client (and AAAv) to be agnostic to MIPv6 procedures (i.e. this removes the dependency on MIPv6 support in the visited network), and act as mere pass-through agent(s), at least when the HA is located in the home network. In other words, the proposed MIPv6 authentication/authorization solution is transparent to the visited domain, which is one of the major advantages of using a protocol like EAP. This makes it possible to apply prior encryption between MN and AAAh and thereby achieve satisfactory security while roaming in foreign networks with MIPv6. In addition, it makes it possible for an operator to deploy the solution without relying on upgrades in its roaming partners' networks.

In accordance with the present invention, deployment of MIPv6 can further be facilitated through eliminating or simplifying the MIPv6 specific configuration of the mobile node and the mobile node specific configuration of the home agent. Such configuration is a part of the general authorization and may include e.g. the home network prefix or the home address, the home agent address and the required IPsec SAs or security parameters on which dynamically established security relations (e.g. IPsec SAs) can be based.

According to other aspects of the invention a system and an AAAh server for MIPv6 support are provided.

BRIEF DESCRIPTION OF THE DRAWINGS

The invention, together with further objects and advantages thereof, is best understood by reference to the following description and the accompanying drawings, in which.

DETAILED DESCRIPTION

A list of abbreviations used in this document follows after this section.

As mentioned in the background section, no complete solution for authentication and/or authorization support of MIPv6 has been presented in the prior art. Moreover, the conventional mechanism of [2] requires the AAA Client and AAAv to understand the authentication method and be aware of the contents of the exchanges of MIPv6-related data between the MN and the AAAh. With such a solution it is not possible to apply prior encryption between MN and AAAh and the exchanges are visible over the air interface. This makes the system highly vulnerable with respect to eavesdropping, man-in-the-middle attacks and the like.

These drawbacks and others are overcome by the present invention, according to which authentication and authorization support for MIPv6 is achieved by transferring MIPv6-related information in an end-to-end procedure between a mobile node visiting a foreign network and the home network of the mobile node over an AAA infrastructure. The MIPv6-related information preferably comprises authentication, authorization and/or configuration information that is transferred over the AAA infrastructure for establishing an immediate or future MIPv6 security association (i.e. security relation) or binding between the mobile node and a home agent. The end-to-end feature is accomplished by means of a new or extended authentication protocol that operates in a manner transparent to the visited domain.

In accordance with the present invention, an authentication protocol carried over the AAA infrastructure is thus proposed for combining the terminal mobility of MIPv6 with user authentication and authorization (typically AAA) in a most advantageous way. Thereby, a complete MIPv6 AAA solution is achieved. In the prior art, there have only been partial solutions that are non-consistent with each other.

By using an end-to-end protocol between the MN and the AAA server in the home network, the present invention creates a MIPv6 AAA solution that is transparent to the visited domain, including the access network, the AAA client and the AAA server in the visited network and other possible intermediate AAA servers. This makes it possible to let the AAA Client, for example, act as mere pass-through agent, which is a considerable advantage. It will also be possible to apply prior encryption between MN and AAAh (e.g. EAP/TTLS [4]) since the exchanges are not visible over the air interface. This means that satisfactory security against eavesdropping, man-in-the-middle and other attacks can be maintained for mobile nodes roaming in foreign networks.

Figure 8:
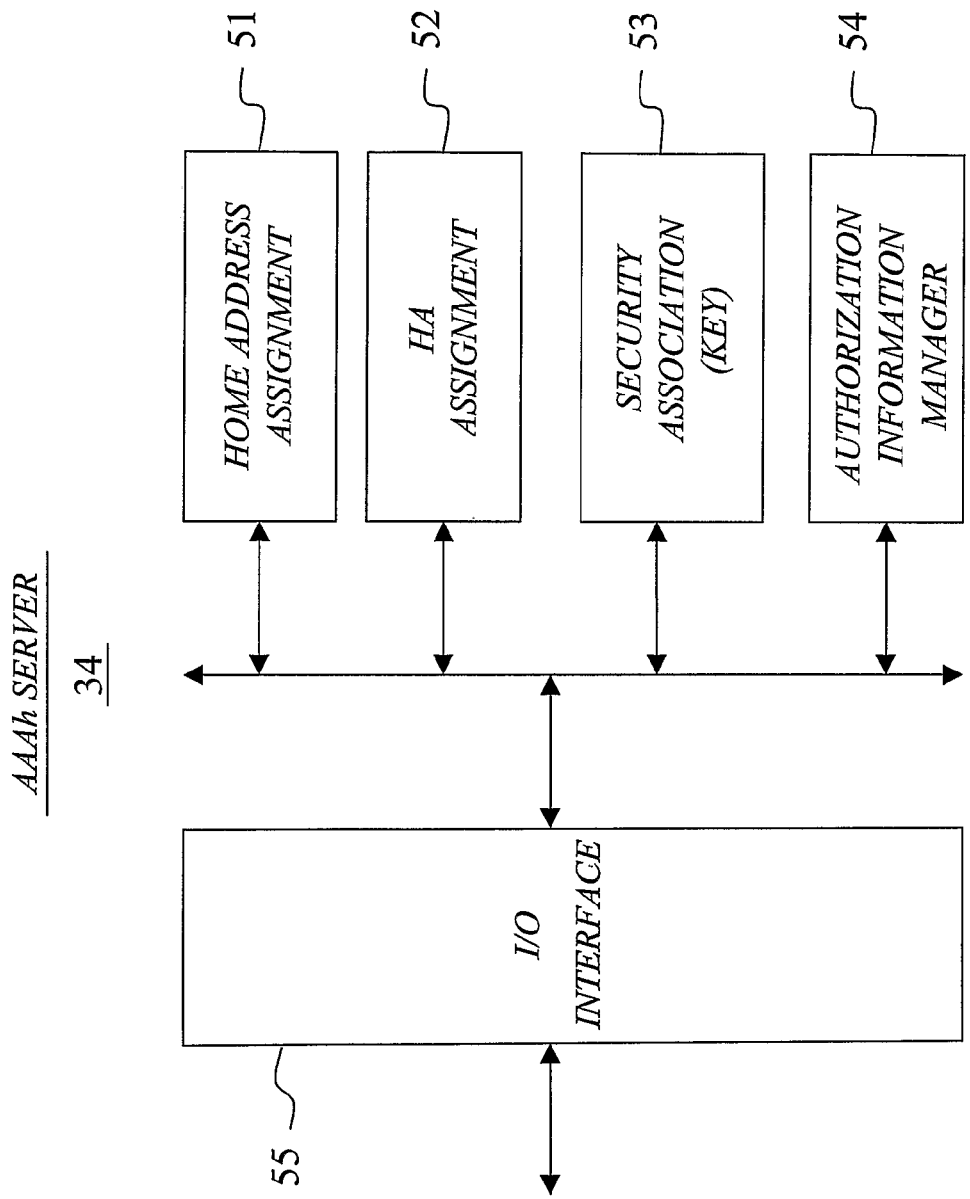
FIG. 8 is a schematic block diagram illustrating an AAA home network server in accordance with an exemplary embodiment of the present invention.

FIG. 8 is a schematic block diagram of an AAA home network server according to a preferred embodiment of the invention. In this example, the AAAh server 34 basically comprises a home address assignment module 51, a home agent (HA) assignment module 52, a security association module 53, an authorization information manager 54 and an input-output (I/O) interface 55. The module 51 preferably performs home address assignment (unless the home address is configured at the mobile node and sent to the HA), and the module 52 is operable for assigning and/or re-assigning a suitable home agent (HA). The AAAh server 34 typically also receives a key seed and a binding update (BU) from the mobile node. Alternatively the AAAh server 34 generates the key seed itself and sends it to the mobile node. The security association module 53 preferably generates the required security key in response to the seed, and securely transfers this key to the HA. The binding update (BU) is also forwarded to the home agent (HA) so that the HA may cache the binding of the home address with the care-of address of the mobile node. The AAAh server may also receive information, such as IPSec information, from the HA for finalizing the security association. This information together with other collected authorization (and/or configuration) information may then be stored in the optional authorization information manager 54 for subsequent transfer to the mobile node.

The authorization phase naturally includes explicit authorization but may also include configuration of the involved nodes. MIPv6-related configuration such as configuration of the mobile node and/or configuration of the HA is therefore normally regarded as part of the overall authorization procedure.

The term "AAA" should be taken within its general meaning of Internet drafts, RFCs and other standardization documents. Typically, the authentication and security key agreement of an AAA (Authorization, Authentication, and Accounting) infrastructure is based on symmetric cryptography, implying the existence of an initial secret shared between the mobile node and the home network operator or a trusted party. In some scenarios and applications, for example the accounting feature of the AAA infrastructure may be disabled or not implemented. The AAA infrastructure generally includes one or more AAA servers, in the home network and/or the visited network, and may also include one or more AAA clients. Optionally, there can also be one or more intermediate networks included in the AAA infrastructure.

The invention preferably uses an extended/modified version of an already defined authentication protocol as basis for the authentication protocol transferring the MIPv6-related data, which in the following will primarily be exemplified by such an extended protocol. Nevertheless, it should be emphasized that the authentication protocols built from scratch also lie within the scope of the invention.

A preferred embodiment of the invention uses an extended authentication protocol based on EAP, creating EAP extensions while typically keeping the EAP lower layer(s) intact. This normally means that the MIPv6-related information is incorporated as additional data in the EAP protocol stack, typically by means of one or more new EAP attribute(s). Different solutions for implementing such EAP attributes will be described in the sections "Method-specific EAP attributes" and "Generic container attribute" below. Before this, some exemplary protocol solutions for carrying the extended authentication protocol over the AAA infrastructure will be described in the section "Carrier protocol examples". General reference will be made to the MIPv6 AAA actors and architecture illustrated in FIG. 1.

CARRIER PROTOCOL EXAMPLES

Figure 1:
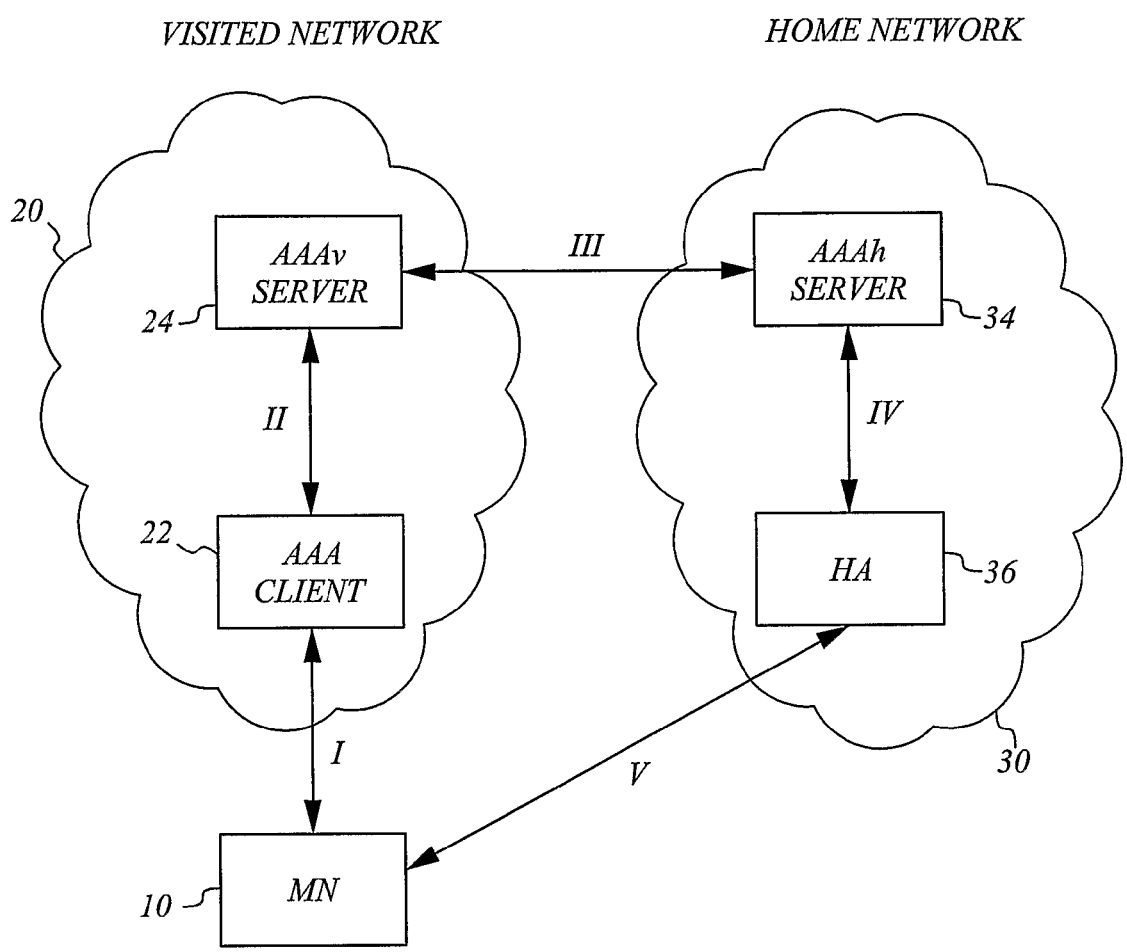
FIG. 1 is a schematic view of a communication system for MIPv6 AAA in which the present invention may be used.

For example, the extended authentication protocol (e.g. extended EAP) may be carried between MN (PAC) 10 and AAA client (PAA) 22, i.e. (I) in FIG. 1, by PANA. Alternatively, other carrier protocols associated with satisfactory lower layer ordering guarantees, such as PPP and IEEE 802.1X [5], may be used to carry the extended authentication protocol between the MN and AAA Client. For 3GPP2 CDMA2000 systems, it is possible to instead use PPP Data Link Layer protocol encapsulation with the protocol field value set to C227 (Hex) for EAP [6].

A preferred embodiment uses an AAA framework protocol application, such as a Diameter application, for the communication between the AAA client 22 and the AAAh server 34 in the home network/domain 30 of the mobile node 10 via the AAAv server 24 in the visited network/domain 20 (II, III). One exemplary embodiment hereby uses the Diameter EAP Application [7] to encapsulate the extended authentication protocol within Diameter beyond the AAA client towards and within the AAA infrastructure, typically between the AAA client and AAAh. Moreover, the Diameter protocol can be used by AAAh for optional assignment of MIP packet filters via MIP filter rules to the PAA/EP and HA, which correspond to the filter enforcement points, as well as for distribution of security keys to PAA for PANA security, and optional signaling of QoS parameters etc.

It should be noted that even though Diameter is the preferred choice, it may sometimes be appropriate to instead use another AAA framework protocol application, such as RADIUS [8, 9] for carrying the extended authentication protocol over II and/or III.

As for the communication between the HA 36 in the home network and the AAA infrastructure (IV) for establishing a security association SA between the HA and the MN 10, e.g. through exchange of security keys, two possibilities are suggested. Firstly, an AAA framework protocol application can be employed for transferring MIPv6 data over IV. For this, the AAAh-HA interface protocol specified in the Diameter MIPv4 Application [10] can for instance be used. As will be explained in the following, embodiments where an extended or new Diameter application or RADIUS extended with new attributes is used to exchange AAA and MIPv6 data between the AAAh 34 and the HA 36 also lie within the scope of the present invention. Secondly, a mechanism similar to the current 3GPP2 solution [11] in conjunction with the IKE framework [12] can be used to distribute dynamic pre-shared keys between MN 10 and HA 36. A KeyID is then used by the HA to retrieve or generate the HA-MN pre-shared key from the AAAh 34. The KeyID is generated by the AAAh and upon successful authentication sent to the MN, which in turn sends it to the HA using IKE (communication path V of FIG. 1).

Still referring to FIG. 1, examples of protocol combinations between the segments MN-AAA client-AAAv-AAAh-HA for MIPv6 support in accordance with the present invention are summarized in Table 1.

TABLE 1

| Communication path | Protocol transferring MIPv6 data |
| --- | --- |
| (I) MN - AAA client | extended authentication protocol (e.g. carried by PANA or IEEE 802.1X) |
| (II, III) AAA client - AAAv - AAAh | extended authentication protocol (e.g. carried by AAA protocol application) |
| (IV) AAAh - HA | AAA protocol application or 3GPP/IKE |

It is assumed that security measures, such as encryption and source integrity protection, are employed for transfer of sensitive information such as the security key(s).

Method-Specific EAP Attributes

In accordance with one particular embodiment of the present invention the MIPv6-related information is transferred as EAP attributes in the EAP method layer of the EAP protocol stack. A new (extended) EAP authentication protocol is then defined to carry a method for MIPv6 authentication. The extended EAP protocol should enable negotiation/enforcement of MIPv6 authentication and may also support some auxiliary information that facilitate e.g., dynamic MN home address allocation, dynamic HA allocation, distribution of security keys between HA and MN, and distribution of security keys between PAC and PAA for PANA security.

The new EAP attributes can for instance be new EAP TLV attributes and exemplary protocol details will now be provided to show the overall flow and viability of concept.

The following EAP-TLVs are examples of new EAP TLVs that may be defined under the extended EAP protocol of the present invention:
i) MD5 Challenge EAP-TLV attribute
ii) MD5 Response EAP-TLV attribute iii) MIPv6 Home Address Request EAP-TLV attribute
iv) MIPv6 Home Address Response EAP-TLV attribute
v) MIPv6 Home Agent Address Request EAP-TLV attribute
vi) MIPv6 Home Agent Address Response EAP-TLV attribute
vii) HA-MN Pre-shared Key Generation Nonce EAP-TLV attribute
viii) IKE KeyID EAP-TLV attribute
ix) HA-MN IPSec SPIEAP-TLV attribute
x) HA-MN IPSec Key Lifetime EAP-TLV attribute
xi) PAC-PAA Pre-shared Key Generation Nonce EAP-TLV attribute
xii) MIPv6 Home Address EAP-TLV attribute
xiii) HA-MNPre-shared Key EAP-TLV attribute
xiv) HA-MN-IPSec Protocol EAP-TLV attribute
xv) HA-MN IPSec Crypto EAP-TLV attribute
xvi) MIP-Binding-Update EAP-TLV attribute
xvii) MIP-Binding-Acknowledgement EAP-TLV attribute By means of (a subset or all of) these attributes, the EAP protocol can, in addition to the main IPv6 authentication information, carry MIPv6-related auxiliary information, which is a considerable advantage. The MIPv6-related auxiliary information can e.g. comprise requests for dynamic MN home address allocation, dynamic Home Agent allocation, as well as nonces/seeds for creation of necessary security keys.

The authentication mechanism of the extended EAP protocol in accordance with the present invention can for example use MD5-Challenge authentication but other types of protocols also lie within the scope of the invention. The following EAP-TLV attributes can be defined for MIPv6 authentication in the case with implementation through MD5-Challenge authentication:

i) MD5 Challenge EAP-TLV Attribute
This represents the octet string generated randomly by the AAAh and sent to MN for MD5 challenge.

ii) MD5 Response EAP-TLV Attribute
This represents the octet string generated as a result of the MD5 hash function with the shared secret key between AAAh and MN.

In case MIPv6-related information that facilitates dynamic MN home address allocation is to be transferred, the following EAP-TLV attributes can for example be defined:

iii) MIPv6 Home Address Request EAP-TLV Attribute
This represents a request for a dynamically allocated MIPv6 home address for the authenticated MN. It will be requested from the AAAh by the MN when the MN initially requests to be authenticated and given MIPv6 service. This EAP attribute is normally defined as an optional attribute when the MN already has a previously assigned home address, such as during MIPv6 handoffs.

iv) MIPv6 Home Address Response EAP-TLV Attribute
This represents a dynamic allocated MIPv6 home address for the authenticated MN. It will be notified to the MN from AAAh when the MN, which has requested a home address, is successfully authenticated. This attribute is normally optional when the MN already has a previously assigned home address, such as during MIPv6 handoffs.

For dynamic HA allocation, the following exemplary EAP-TLV attributes can be used:

v) MIPv6 Home Agent Address Request EAP-TLV Attribute
This represents a request for an address of a dynamically allocated HA for the MN when successfully authenticated. It will be requested from the AAAh by the MN when the MN initially requests to be authenticated and given MIPv6 service. In cases where HA allocation is already at hand, such as when the dynamic HA discovery method of the MIPv6 protocol is used to allocate the HA or when the MN already has a previously assigned HA (e.g. during MIPv6 handoffs), this attribute is normally defined to be optional.

vi) MIPv6 Home Agent Address Response EAP-TLV Attribute
This represents an address of a dynamic allocated HA for the authenticated MN. It will be notified to the MN from the AAAh when the MN initially requests to be authenticated and given MIPv6 service. Since the MIPv6 protocol has a dynamic home agent discovery method for home agent allocation, this attribute would normally be optional. This is also the case when the MN already has a previously assigned HA, e.g. during MIPv6 handoffs.

The following exemplary EAP-TLV attributes can be defined for distribution of security keys between HA and MN:

vii) HA-MN Pre-Shared Key Generation Nonce EAP-TLV Attribute
This represents the octet string generated randomly by MN as a seed for generating a pre-shared key between HA-MN. The MN can internally generate the HA-MN pre-shared key by using an appropriate hash algorithm on the combination of this nonce and the shared key between MN and AAAh. This attribute would normally be optional when a valid HA-MN pre-shared key already exists, for example during MIPv6 handoffs.

viii) IKE KeyID EAP-TLV Attribute
This represents the ID payload defined in [13]. The KeyID is generated by the AAAh and sent to the MN upon successful authentication. The KeyID includes some octets which informs the HA about how to retrieve (or generate) the HA-MN pre-shared key from AAAh. This attribute is typically defined to be optional, and would generally not be needed when the MN has not submitted a HA-MN pre-shared key generation nonce, i.e. a valid HA-MN pre-shared key already exists, e.g. during MIPv6 handoffs. Nor will it normally be needed in the case when the HA-MN pre-shared key is conveyed by the AAAh to the HA via the AAAh-HA interface defined in [10] (or using, for example, any of the other protocols mentioned above under "Carrier protocol examples").

ix) HA-MN IPSec SPI EAP-TLV Attribute
This represents the Security Parameter Index for IPSec between the HA and MN. This attribute is generated by the HA and communicated to the MN in case the HA-MN pre-shared key is conveyed by the AAAh to the HA via the AAAh-HA interface defined in [10] (or using, for example, any of the other protocols mentioned above under "Carrier protocol examples"). This attribute would typically be optional and is generally not needed when the MN has not submitted a HA-MN pre-shared key generation nonce, i.e. a valid HA-MN pre-shared key already exists, e.g. during MIPv6 handoffs. It is also not needed when the AAAh-HA interface is not used.

x) HA-MN IPSec Key Lifetime EAP-TLV Attribute
This represents the Key Lifetime for IPSec between the HA and MN. This attribute is generated by the HA and communicated to the MN in case the HA-MN pre-shared key is conveyed by the AAAh to the HA via the AAAh-HA interface defined in [10] (or using, for example, any of the other protocols mentioned above under "Carrier protocol examples"). This attribute is typically optional and generally not needed when the MN has not submitted a HA-MN pre-shared key generation nonce, i.e. a valid HA-MN pre-shared key already exists, e.g. during MIPv6 handoffs. It would typically also not be needed when the AAAh-HA interface is not used.

In case PANA is used to carry the extended EAP protocol between MN and AAA client, the following exemplary EAP- TLV attribute can be defined for distribution of security keys between MN/PAC and AAA client/PAA for PANA security:

xi) PAC-PAA Pre-Shared Key Generation Nonce EAP-TLV Attribute

This represents the octet string generated randomly by MN/PAC as a seed for generating the pre-shared key between MN/PAC and AAA client/PAA. The MN/PAC can internally generate the PAC-PAA pre-shared key by using an appropriate hash algorithm on the combination of this nonce and the shared key between MN and AAAh. By means of this attribute satisfactory PANA security can be achieved.

Finally, the following optional EAP-TLV attributes may be defined for special MIPv6 purposes:

xii) MIPv6 Home Address EAP-TLV Attribute

This represents a dynamically allocated MIPv6 home address for the authenticated MN. It will be notified to the HA from AAAh in order to assign the MIPv6 home address in the HA, when the MN, which has requested for one, has been successfully authenticated.

xiii) HA-MN Pre-Shared Key EAP-TLV Attribute

This represents a dynamically generated pre-shared key between HA-MN. It will be notified to the HA from the AAAh when a MN requests to be authenticated and given MIPv6 service. The AAAH can internally generate the HA-MN pre-shared key by using an appropriate hash algorithm on the combination of the nonce given by the HA-MN Pre-shared Key Generation Nonce EAP-TLV Attribute and the shared key between MN and AAAh. This attribute is optional when a valid HA-MN pre-shared key already exists.

xiv) HA-MN IPSec Protocol EAP-TLV Attribute

This represents the IPSec Protocol (e.g. ESP or AH) between HA-MN. This is informed to the MN for the case when the HA-MN pre-shared key is conveyed by the AAAh to the HA. This attribute is optional and is generally not needed when the MN did not submit a HA-MN pre-shared key generation nonce, i.e., a valid HA-MN pre-shared key already exists, e.g., during MIPv6 handoffs.

xv) HA-MN IPSec Crypto EAP-TLV Attribute

This represents the Cryptographic Algorithm for IPSec between HA-MN. This is informed to the MN for the case when the HA-MN pre-shared key is conveyed by the AAAh to the HA. This attribute is optional and is generally not needed when the MN did not submit a HA-MN pre-shared key generation nonce, i.e., a valid HA-MN pre-shared key already exists, e.g., during MIPv6 handoffs.

xvi) MIP-Binding-Update EAP-TLV Attribute

This represents the Binding Update packet generated by the MN. This is forwarded to the HA via AAAh from the MN in the authentication and authorization exchanges. This attribute is optional and is generally not needed when the MN sends Binding Update packet directly to HA.

xvii) MIP-Binding-Acknowledgement EAP-TLV Attribute

This represents the Binding Acknowledgement packet generated by the HA. This is forwarded to the MN via AAAh from the HA in the authentication and authorization exchanges. This attribute is optional and is generally not needed when the HA sends Binding Acknowledgement packet directly to MN.

A summary matrix of the described exemplary EAP-TLVs for transfer of MIPv6-related information is given below in Table 2.

TABLE 2

| MIPv6-related EAP Type-Length-Values | Source | Destination | Purpose |
| --- | --- | --- | --- |
| MD5 Challenge EAP-TLV attribute | AAAh | MN | issue challenge |
| MD5 Response EAP-TLV attribute | MN | AAAh | provide response to challenge |
| MIPv6 Home Address Request EAP-TLV attribute | MN | AAAh | request MN home address |
| MIPv6 Home Address Response EAP-TLV attribute | AAAh | MN | assign MN home address |
| MIPv6 Home Agent Address Request EAP-TLV attribute | MN | AAAh | request HA address |
| MIPv6 Home Agent Address Response EAP-TLV attribute | AAAh | MN | assign HA address |
| HA-MN Pre-shared Key Generation Nonce EAP-TLV attribute | MN | AAAh | seed for HA-MN key |
| IKE KeyID EAP-TLV attribute | AAAh | MN | info for obtaining HA-MN pre-shared key from AAAh |
| HA-MN IPSec SPI EAP-TLV attribute | HA | MN via AAAh | assign SPI |
| HA-MN IPSec Key Lifetime EAP-TLV attribute | HA | MN via AAAh | assign IP Sec Key lifetime |
| PAC-PAA Pre-shared Key Generation Nonce EAP-TLV attribute | MN | AAAh | seed for PAC-PAA key |
| MIPv6 Home Address EAP-TLV attribute | AAAh | HA | assign MN Home Address |
| HA-MN Pre-shared Key EAP-TLV attribute | AAAh | HA | assign HA-MN key |
| HA-MN IPSec Protocol EAP-TLV attribute | HA | MN via AAAh | assign IPSec Protocol |
| HA-MN IPSec Crypto EAP-TLV attribute | HA | MN via AAAh | assign IPSec Crypto |
| MIP-Binding-Update EAP-TLV attribute | MN | HA via AAAh | piggyback MIP binding update |
| MIP-Binding-Acknowledgement EAP-TLV attribute | HA | MN via AAAh | piggyback MIP binding ack. |

Figure 2:
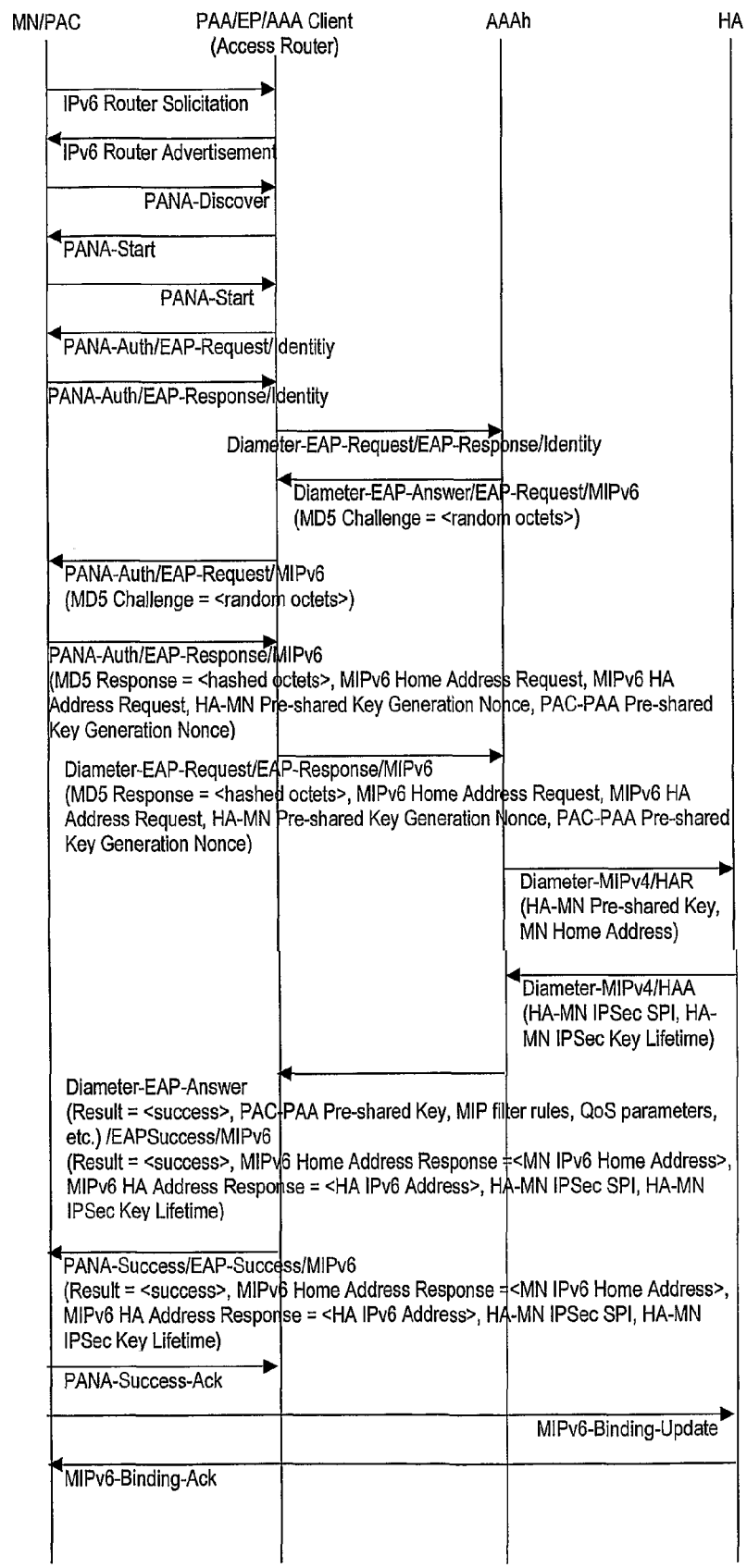
FIG. 2 is a signal flow diagram of MIPv6 initiation in accordance with a first exemplary embodiment of the present invention.
Figure 3:
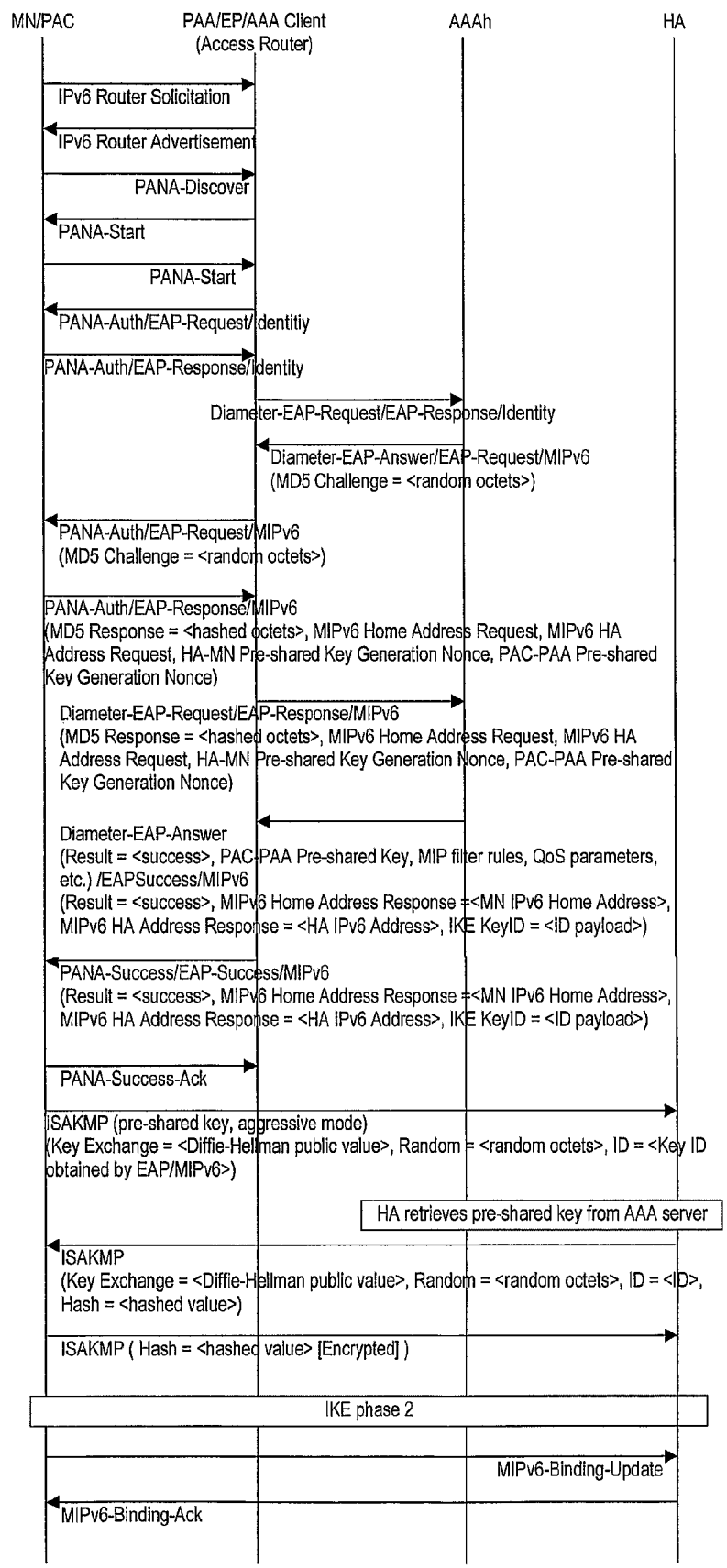
FIG. 3 is a signal flow diagram of MIPv6 initiation in accordance with a second exemplary embodiment of the present invention.
Figure 4:
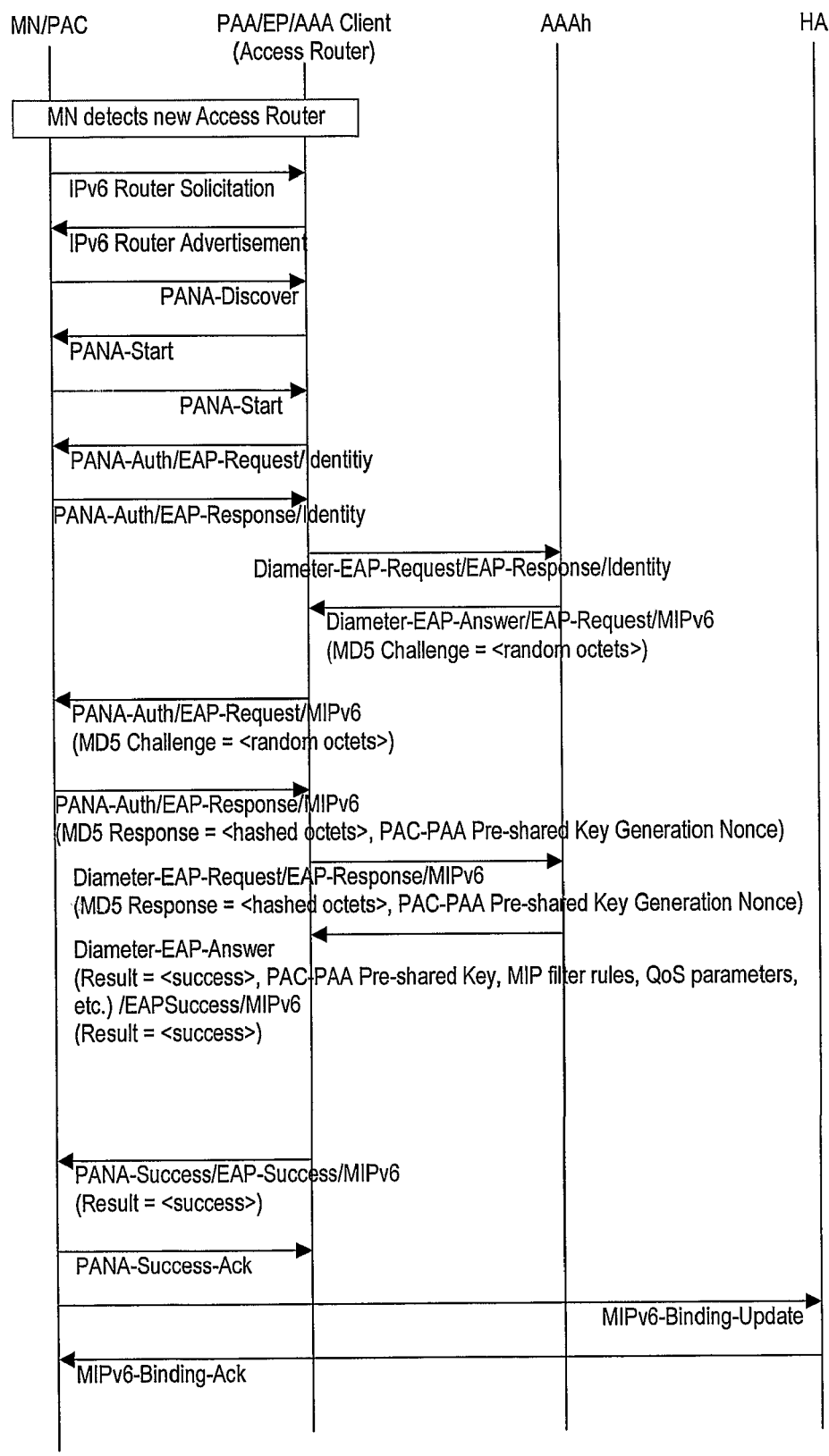
FIG. 4 is a signal flow diagram of MIPv6 handoff in accordance with an exemplary embodiment of the present invention.

Exemplary schemes for handling MIPv6 initiation and handoff according to the invention are provided in the signaling flow diagrams FIGS. 2, 3 and 4. Transfer of MIPv6-related information implemented using the above-described exemplary EAP TLV attributes between the MN, AAA client, AAAh and HA is shown. The term "EAP/MIPv6" here refers to the new extended EAP protocol that is used to transfer the MIPv6-related information over the AAA infrastructure in preferred embodiments of the invention. The illustrated examples relate to MIPv6 AAA using a combination of PANA and Diameter as carrier protocols. The flow diagram in FIG. 2 illustrates MIPv6 initiation with use of an AAAh-HA interface according to [10] for exchange of a HA-MN pre-shared key. Another embodiment of the MIPv6 initiation mechanism, illustrated in FIG. 3, uses IKE KeyID for exchange of a HA-MN pre-shared key. The signaling flows of FIG. 4 describe MIPv6 handoff in accordance with an exemplary embodiment of the invention.

Generic Container Attribute

In another embodiment of the present invention, the MIPv6-related information is carried in a generic container EAP attribute that preferably can be used together with any EAP method included in any EAP packet. EAP is thus augmented with a generic container attribute (also referred to as GCA) that can be used to carry non-EAP related data, more specifically MIPv6-related data, between the MN 10 and the AAAh 34. This allows the MN and the AAAh to communicate in a manner that is transparent to the visited domain 20, including the access network, the AAA client and the AAAv 24. Thus, just as in the above described case with method-specific EAP TLV attributes, the AAA infrastructure is exploited to support MIPv6 related features in a way that is transparent to the visited domain. The solution can for example support dynamic HA assignment in the home network (including the home network prefix); distribution of MN-HA credentials; MIPv6 message encapsulation; a single authenticating entity for network access and MIPv6; and/or stateful dynamic home address assignment.

When using the generic container attribute, EAP is preferably used as a carrier of MIPv6 related data without creating a new EAP method. However, another variant is to introduce the generic container attribute in one (or more) EAP method (s) on the method layer of the protocol stack. A new EAP method for transfer of the MIPv6-related data is hereby defined and the generic container attribute is used only in this new EAP method. In other words, the generic container attribute can be method specific in a manner similar to that described in association with the EAP TLV attributes.

As before, EAP is carried in an AAA framework protocol, such the Diameter EAP Application [7] or RADIUS [8, 9], between the AAA client 22 and the AAAh 34.

However, it is also proposed to use a new/extended Diameter application (or RADIUS extended with new attributes) to exchange AAA and MIPv6 data between the AAAh 34 and the HA 36. This Diameter application can be an extended version of an existing Diameter application, e.g. the Diameter EAP Application [7], or a new Diameter application. This new/extended new Diameter application (or extended RADIUS) is henceforth referred to as a "Diameter MIPv6 application". It should be emphasized that this reference is used only for simplicity and does not exclude use of extended RADIUS or other methods for AAAh-HA communication, including the mechanisms mentioned above in the section "Carrier protocol examples".

Preferred ways of handling the authentication procedure, including assignment of home agents and home addresses, using generic container attributes in accordance with the present invention will now be described, primarily using the EAP protocol as example and still referring to FIG. 1.

During the authentication procedure the MN 10 indicates to the AAAh 34 through the generic container attribute that it wishes to have a HA 36 assigned in the home network 30. There are now three cases to consider:

A) The MN already has a valid home address.
B) Stateful dynamic home address assignment is used.
C) Stateless home address autoconfiguration is used.

If the MN 10 already has a home address (A), it sends it to the AAAh 34 together with a request for a home agent address. If the AAAh determines that the home address is valid, it selects a HA 36 and generates MN-HA credentials, such as a pre-shared key or data from which a pre-shared key can be derived. The home address of the MN and the generated MN-HA credentials can for example be sent to the selected HA via the Diameter MIPv6 Application. The address of the selected HA and the generated credentials (or data from which the generated credentials can be derived) are sent to the MN via the extended authentication protocol e.g. extended EAP. If, for example, a pre-shared key is sent to the MN, it has to be protected (encrypted and integrity protected) by keys derived from the security relation between the AAAh and the MN (e.g. session keys produced during the authentication procedure). Otherwise the pre-shared key should not be sent explicitly. Instead, a piece of data from which the pre-shared key (or other credentials) can be derived based on the MN-AAAh security relation, e.g. a nonce, can be sent (e.g. a RAND parameter to be fed into the AKA or GSM authentication algorithm if EAP AKA [14] or EAP SIM [15] is used). If cryptographic protection is applied to the credentials, it may be convenient to use the same kind of protection for the HA address and the home address.

When the network access authentication is finalized and the MN is authorized to access the network beyond the access server (e.g. a WLAN AP or an access router), the MN can establish IPsec SAs towards the assigned HA via IKE (e.g. IKEv1 or IKEv2) procedures based on the obtained credentials. This procedure and the subsequent binding update/binding acknowledgement (BU/BA) exchange are carried out using conventional IKE and MIPv6 mechanisms.

If the MN either includes no home address at all or includes a home address that is no longer valid (e.g. due to MIPv6 home network renumbering) in its request for a home agent, a home address should be assigned to the MN. For this the present invention proposes mechanisms for stateful dynamic home address assignment (B) or stateless home address autoconfiguration (C).

The present invention enables stateful dynamic home address assignment (B), whereby the AAAh 34 assigns a home address to the MN 10. The AAAh also generates MN-HA credentials, which it preferably sends to the selected HA 36 together with the assigned home address via the Diameter MIPv6 Application. The AAAh also sends the assigned home address together with the address of the assigned HA and the generated credentials (or data from which the generated credentials can be derived) to the MN via the extended authentication protocol of the invention, exemplified by extended EAP. As in case (A), either the MN-HA credentials are protected before being sent over the extended authentication protocol or, alternatively, data from which the credentials can be derived, e.g. a nonce, is sent instead of the actual credentials. After the network access authentication is concluded, the MN can establish IPsec SAs and perform BU/BA exchange towards the assigned HA using conventional IKE and MIPv6 mechanisms.

In case stateless autoconfiguration of home addresses is used (C), the procedure depends on the number of roundtrips of the selected EAP method. In response to the request for a HA 36 the AAAh 34 returns a HA address together with credentials (or data from which the credentials can be derived) to the MN 10. The MN typically uses the prefix of the received HA address to build a home address. If the EAP procedure is not finalized, i.e. if the HA address was conveyed in an EAP Request packet and not in an EAP Success packet, the MN sends its home address to the AAAh. The AAAh then sends the received home address together with the credentials to the assigned HA. The HA should then perform DAD for the received home address on its subnet. Provided that the duplicate address detection (DAD) is successful, the MN and the HA will later be able to establish IPsec SAs and exchange BU/BA packets using conventional IKE and MIPv6 mechanisms.

If the MN instead receives the HA address in the final packet of the EAP procedure (i.e. the EAP Success packet), it cannot convey its newly built home address to the AAAh. A way to solve this problem of an insufficient number of EAP roundtrips is to let the AAAh increase the number of EAP roundtrips using EAP Notification Request/Response packets for enabling transfer of the generic container attribute.

A major advantage of the described mechanisms is that they simplify configuration of both the MN 10 and the HA 36. The MN can leverage its network access configuration parameters (the NAI and the MN-AAAh security relation) and no MIPv6 specific configuration is needed. The HA will not need any MN specific configuration, since the HA-AAAh security relation is enough. The AAAh 34 can, to a large extent, form a single authenticating entity for both network access and MIPv6 (although IKE authentication may still be performed in the HA based on data received from the AAAh).

If valid MN-HA security associations (e.g. IPsec SAs) already are present, the MN 10 does not need to request a HA address from the AAAH 34. Instead it may reduce the overall access delay by encapsulating the BU in the generic container attribute and send it to the AAAh via the extended authentication protocol. The AAAh preferably encapsulates the BU in a Diameter MIPv6 Application message and sends it to the HA 36 indicated by the destination address of the BU. The HA responds with a BA and the AAAh relays the response to the MN. The encapsulated BU and BA are protected by the MN-HA IPsec SAs. According to a preferred embodiment, the AAAh checks that the HA address is valid and that the MIPv6 home network has not been renumbered before sending the BU to the HA. Should the HA address not be valid, the AAAh normally indicates the error to the MN and assigns a HA as described above, i.e. the AAAh sends a HA address, credentials (or data from which the credentials can be derived) and possibly a home address to the MN etc.

The Diameter MIPv6 Application may sometimes be used also to convey accounting data generated in the HA 36. This can be useful for instance when reverse tunneling is employed (i.e. when all traffic to and from the MN is transferred via the HA and tunneled between the MN and the HA) and the home operator wants to be able to verify the accounting data that is received from the AAAv 24.

Now, some exemplary implementations of a generic container attribute (GCA) in accordance with the present invention will be described more in detail.

Preferably the GCA attribute is available to all methods and can be included in any EAP message, including EAP Success/Failure messages. This implies that it should be a part of the EAP layer rather than the EAP method layer (see [16]). Hereby, an important issue to consider is backward compatibility in terms of the MN and the EAP authenticator (typically the EAP entity in the Network Access Server (NAS)). The use of the generic container attribute in the above examples assumes that the new attribute is introduced in EAP in a manner that is backward compatible and transparent to the EAP authenticator. Introducing a GCA with these properties requires some special considerations, which will be elaborated in the following paragraphs.

Figure 5A:
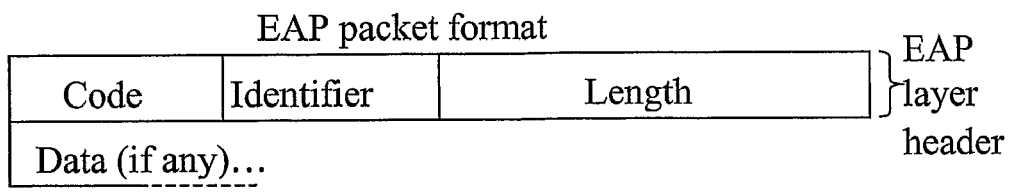
FIG. 5 illustrates conventional EAP packet formats.
Figure 5B:
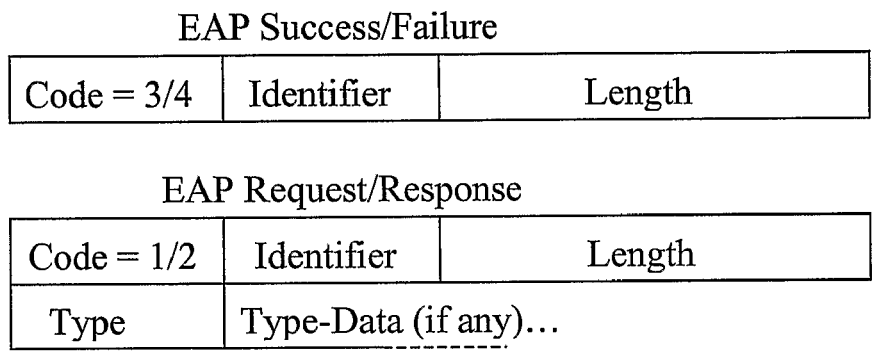

For reference in the below discussion, FIG. 5 illustrates the current EAP packet formats [6, 16]. FIG. 5A shows the general EAP packet format, with an EAP layer header containing code, identifier and length fields and an optional data field. The assigned EAP codes are defined as: 1=Request, 2=Response, 3=Success, and 4=Failure. The format of EAP Success/Failure packets (code=3/4) and EAP Request/Response packets (code=1/2), respectively, are illustrated in FIG. 5B. Assigned EAP types: 1=Identity, 2=Notification, 3=Nak, 4- . . . =Authentication methods.

The format of the GCA could for example be a two-byte GCA length indicator followed by a GCA recipient indicator and a GCA payload. The GCA recipient indicator then indicates to what internal entity the EAP module is to send the payload of a received GCA (i.e. this indicator corresponds to the protocol/next header field in the IP header or the port number in the UDP and TCP headers). The GCA payload is a generic chunk of data not interpreted by the EAP layer. Absence of GCA can for example be indicated by a GCA length indicator set to zero.

To achieve backward compatibility, the GCA should be included in the EAP packets in a way that is transparent to pass-through EAP authenticators. A pass-through EAP authenticator is an EAP authenticator residing in a NAS, which relays EAP packets between the MN and a back-end EAP authentication server (an AAA server). The pass-through behavior of an EAP authenticator is to relay EAP packets based on the EAP layer header, i.e. the Code, Identifier and Length fields in the beginning of the EAP packets. This implies that the desired transparency and hence backward compatibility can be achieved by locating the GCA after the EAP layer header, i.e. after the Code, Identifier and Length fields.

However, an EAP authenticator normally also has to check the Type field (following the EAP layer header) of EAP Response packets in order to identify EAP Identity Response packets, from which the NAI that is needed for the AAA routing can be extracted. When the EAP authenticator identifies an EAP Identity Response packet, it extracts the NAI from the Type-Data field following the Type field. Hence, placing the GCA immediately after the EAP layer header (in a manner that is transparent to the EAP authenticator) is only possible in EAP Request packets. Therefore, it would normally be preferred to arrange the GCA after the Type field or even after the (possibly NULL-terminated) Type-Data field.

Placing the GCA immediately after the Type field would enable the use of the GCA in all EAP Response packets but EAP Identity Response packets. The use of the GCA in EAP Identity Response packets would be prohibited, because from these packets the EAP authenticator needs to extract the NAI from the Type-Data field, which a legacy EAP authenticator would expect to find immediately after the Type field. This can be a restriction for the GCA usage considering that EAP normally has rather few roundtrips. Possibly, the GCA could be placed after a NULL-terminated Type-Data field in the EAP Identity Response packet, while keeping its position after the Type field in other EAP packets.

However, it would often be desirable with a GCA position that can be used consistently in all EAP packets. It follows from the above discussion that a position in which the GCA could be placed in all EAP packets in a backward-compatible manner is at the end of the packet, more or less as a trailer. However, this GCA location would cause problems for those EAP packets that do not have explicit length indicators for the Type-Data parameter(s), but rely on the Length field in the EAP layer header. For such packets, it would generally not be possible to distinguish between the GCA and the Type-Data field.

Figure 6A:
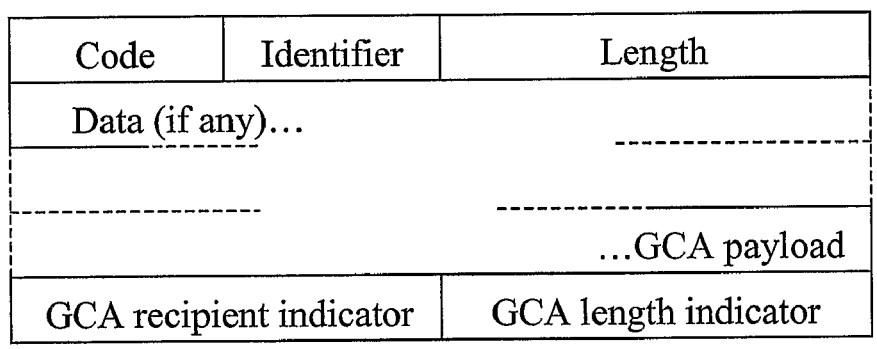
FIG. 6 illustrates the location and format of a GCA attribute in accordance with an exemplary embodiment of the present invention.
Figure 6B:
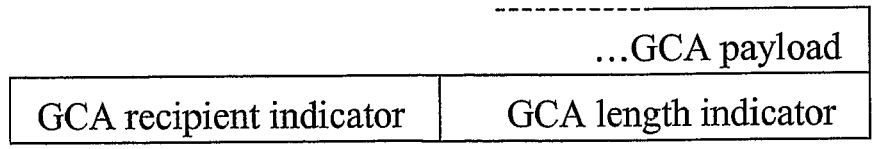

To overcome this problem, it is according to a particular preferred GCA embodiment proposed to reverse the order of the GCA length indicator, the GCA recipient indicator and the GCA payload such that the GCA length indicator appears last. By placing the GCA at the end of an EAP packet, the last two octets of the EAP packet (whose length is indicated by the Length field in the EAP layer header) would always be the GCA length indicator. Unless the GCA length indicator is zero, the GCA recipient indicator appears before the GCA length indicator and the GCA payload (whose size is determined from the GCA length indicator) is located before the GCA recipient indicator. In this way, it is always be possible to identify the GCA of an EAP packet and to distinguish the GCA from the Type-Data field, while the use of the GCA would still be transparent for a pass-through EAP authenticator. The location and format of a preferred GCA in accordance with the present invention are illustrated in FIG. 6. The location of the GCA in an EAP packet of the general format is shown in FIG. 6A. The GCA is arranged as a trailer at the end of the packet. The suggested GCA format with the GCA length indicator arranged last, after the GCA payload and the GCA recipient indicator is shown in FIG. 6B.

Backward compatibility with the GCA embodiment of FIG. 6 further presumes that the EAP authenticator does not try to extract information from the EAP Request/Response packets (except the EAP layer header and the NAI) and that it accepts that the Length field in the Success/Failure packets indicates a value greater than 4.

An alternative way of coping with the backward compatibility problem is to use EAP GCA Test Request/Response packets, i.e. new EAP packets with newly defined values of the Type field, to determine whether the MN supports the GCA. Before or after the initial EAP Identity Request/Response packet exchange, an EAP authenticator supporting the GCA then sends an EAP GCA Test Request packet, i.e. an EAP Request packet with a dedicated Type value, to the MN. (The EAP peer state machine in [17] indicates that both the alternative sending times are feasible.) If the MN supports the GCA, it responds with an EAP GCA Test Response packet. Otherwise, the MN interprets the EAP GCA Test Request packet as a request to use an unknown EAP method and therefore the MN responds with an EAP Nak packet. Based on the response from the MN, the EAP authenticator determines whether the MN supports the GCA.

A MN supporting GCA can determine whether the EAP authenticator supports the GCA from the presence or absence of the EAP GCA Test Request packet. If an EAP GCA Test Request packet is received when expected i.e. before or after the EAP Identity Request/Response exchange, the EAP authenticator is assumed to support the GCA. Otherwise, the MN draws the conclusion that the EAP authenticator does not support the GCA.

If both the MN and the EAP authenticator support the GCA, it can be placed after the EAP layer header in all subsequent EAP packets (with the original order of the GCA components). Otherwise, the GCA may still be included in the EAP packets that allow it to be included in the backward-compatible manner described above.

There are some limitations to the described alternative way of dealing with the backward compatibility problem. Firstly, one MN-EAP authenticator roundtrip is wasted. Moreover, if the EAP GCA Test Request/Response packets are exchanged after the initial EAP Identity Request/Response packet exchange, the GCA cannot be used in the EAP Identity Response packet. This embodiment may also require that the EAP authenticator (probably the NAS) uses a modified version of EAP, such as EAPv2. Accordingly, although other alternatives are possible, the preferred way of arranging the GCA in EAP packets would typically be as illustrated in FIG. 6, whereby backward compatibility with EAP authenticators can be achieved for all EAP packets.

If the number of EAP roundtrips is not enough for the data that is exchanged in the GCA, the AAAh may increase the number of EAP roundtrips through EAP Notification Request/Response exchanges for the purpose of conveying the GCA.

If the GCA is made method specific, the GCA does not introduce any problems related to backward compatibility, since it will then normally be a part of the Type-Data field.

In the Internet draft [18] of February 2004, Mobile IPv6 authorization and configuration based on an AAA infrastructure are suggested. The necessary interaction between the AAA server of the home provider and the mobile node for MIPv6 is realized using Protected EAP to convey information for Mobile IPv6 negotiation together with authentication data. However, whereas the described generic container attribute according to the present invention can be integrated in the EAP procedures, the MIPv6 data of [18] is added in a second phase. Another advantageous feature of the solution described herein is related to security mechanisms. In accordance with the present invention, it is possible to leverage the MN-AAAh security relation to ensure that credentials are not disclosed. [18], on the other hand, relies on Protected EAP for protecting the credentials. Moreover, [18] results in that a number of roundtrips are added and the overall network access delay is increased, whereas the mechanism proposed herein even makes it possible to decrease the overall network access delay.

Extended Solution—Local Home Agent

Figure 7:
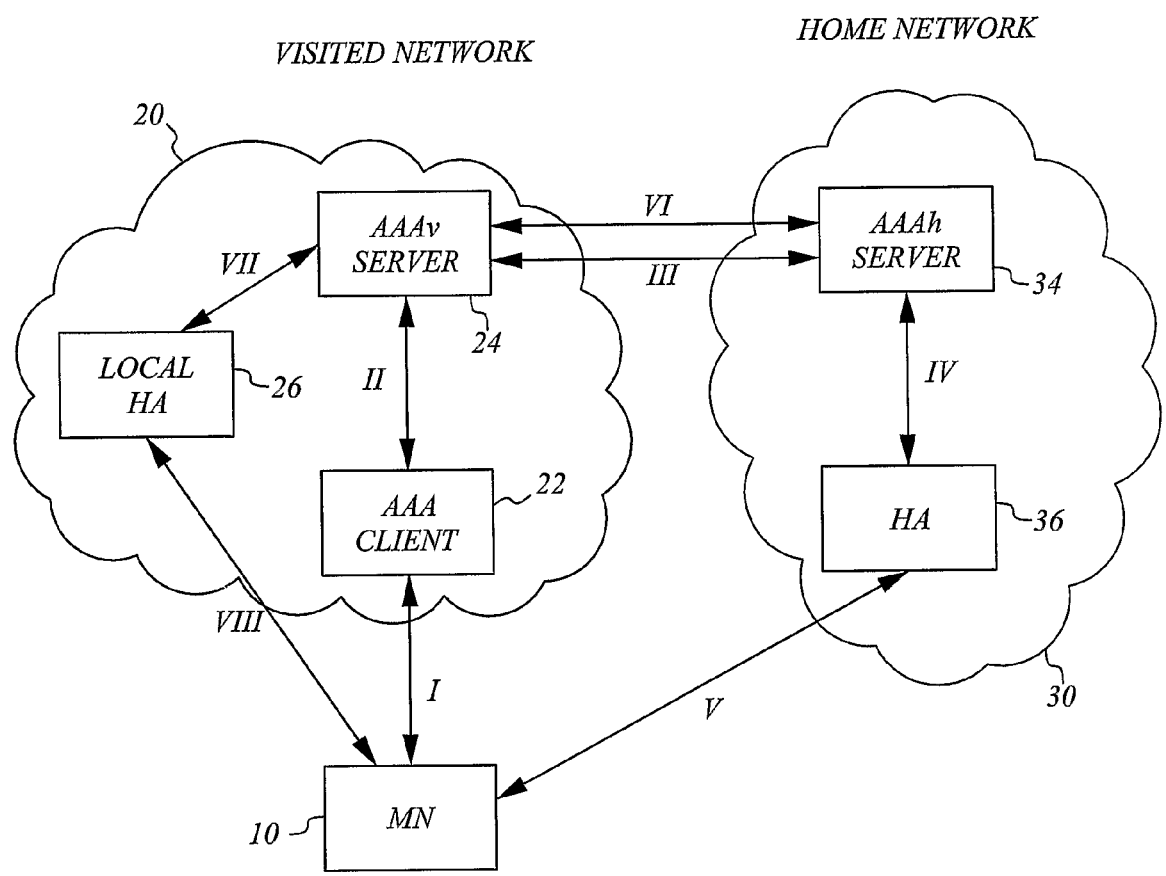
FIG. 7 is a schematic view of a communication system for MIPv6 AAA in accordance with an exemplary embodiment of the present invention.

FIG. 7 schematically illustrates another exemplary embodiment of the mobility support mechanism of the present invention, in which a so-called "local Home Agent" 26 is arranged in the visited network 20. As will be evident from the following description, the local HA 26 can be used to complement the HA 36 in the home network 30 in a most advantageous way. The HA in the home network and the local HA in the visited network would normally be used one at a time and not simultaneously.

This embodiment is an extension of the solution described with reference to FIG. 1 (in the following also referred to as "the basic solution"), which for example can use method-specific EAP attributes or a generic container attribute, and it requires MIPv6 support in the AAAv 24. A target scenario for this extended solution is the case when there is no HA 36 in the home network 30. Instead a local HA 26 is dynamically assigned to a roaming MN 10 in the visited domain 20. The basic solution is reused (except that the AAAh-HA communication (IV) is not used in case there is no HA in the home network) and on top of that the Diameter MIPv6 Application is extended, so that it can be used between the AAAh 34 and the AAAv 24 (VI) to enable assignment of a local HA 26 in the visited domain 20. The Diameter MIPv6 Application is also used between the AAAv 24 and the local HA 26 (VII).

Thus, the path between the MN 10 and the local HA 26 will be a "tromboning" path (the path traverses the AAAv-AAAh leg in both directions): MN↔AAA client↔AAAv↔AAAh↔AAAv↔local HA (I, II, III, VI, VII). However, MIPv6 signaling that is not integrated with AAA signaling, e.g. a subsequent BU/BA exchange, will follow the direct MN-local HA path (VIII).

Since the above-described functionality of paths I, II, III, IV is reused (except for IV when there is no HA in the home network) from the basic solution, only the added functionality for local HA assignment needs to be described in detail.

Assigning a local HA 26 essentially means that the AAAh-HA communication described in the basic solution is turned into AAAh-AAAv-local HA communication. Hence, the total MN-local HA path has the following structure: MN-AAA client-AAAv-AAAh-AAAv-local HA. In this path an extended authentication protocol, such as extended EAP, is used from the MN and to the AAAh. In the AAA client-AAAv-AAAh part of the path EAP is carried in an existing AAA protocol, e.g. the Diameter EAP Application or RADIUS. In the AAAh-AAAv-local HA part of the path the Diameter MIPv6 Application is used. The conveyed information is essentially the same as in the basic solution.

Still referring to FIG. 7, examples of protocol combinations between the segments MN-AAA client-AAAv-AAAh-HA and AAAh-AAAv-local HA for the extended MIPv6 support in accordance with the present invention are summarized in Table 3. In the case with a local HA 26, the AAAh 34 forwards the request for HA to the appropriate AAAv 24, via an AAA protocol application, preferably a Diameter application such as the Diameter MIPv6 Application (but it could also be for example an extended version of RADIUS). The AAA framework protocol application(s) carrying the new/ extended authentication protocol over paths (II, III) and transferring MIPv6 data over paths (IV, VI, VII) can for instance be Diameter application(s).

TABLE 3

| Communication path | Protocol transferring MIPv6 data |
|---|---|
| (I) MN - AAA client | Extended authentication protocol (e.g. carried by PANA or IEEE 802.1X) |
| (II, III) AAA client - AAAv - AAAh | Extended authentication protocol (e.g. carried by AAA protocol application) |
| (IV) AAAh - HA | AAA protocol application or 3GPP2 + IKE |
| (VI, VII) AAAh - AAAv - local HA | AAA protocol application |

Assuming first that there is no HA 36 in the home network 30. In this scenario the only way to provide MIPv6 support to the MN 10 is to assign a local HA 26 in the visited domain 20. Thus, when the request for a HA address is received in the AAAh 34, the AAAH forwards the request to the AAAv 24 via the Diameter MIPv6 Application. The AAAh also generates MN-HA credentials and, if needed, a home address for the MN. The credentials and the home address (or the NAI if no home address is available) are sent to the AAAv along with the request for a local HA address.

When receiving the request for a local HA address, the AAAv 24 selects a local HA 26 and sends the credentials and the home address (or NAI) to the selected HA using the Diameter MIPv6 Application. The AAAv then returns the address of the local HA to the AAAh 34. The AAAv may also generate SPIs for the MN-HA IPsec SAs (which thus in this extended solution are not generated by the AAAh). In such case the AAAv sends one of the SPIs to the local HA and returns the other SPI to the AAAh together with the address of the local HA. If the AAAh subsequently receives a statelessly configured (i.e. autoconfigured) home address from the MN 10, the Diameter MIPv6 Application can be used to convey the home address to the AAAv and the local HA.

The subsequent IKE (IKEv1 or IKEv2) procedure (if used) and MIPv6 procedure are the same as described in the basic solution, except that the MN 10 communicates directly with a local HA 26 instead of a HA 36 in the home network 30.

Assuming now that there is a HA 36 in the home network 30. In such a case a local HA 26 should not be assigned as long as the MN 10 has a valid binding in a HA in the home network. If the MN does not have a valid binding in a HA in the home network and sends a request for a HA address to the AAAh 34, it may include an indication of whether it prefers a local HA or a HA in the home network. The AAAh may consider this indication, but in the end it is the AAAh that decides whether a local HA or a HA in the home network should be assigned to the MN. If the AAAh decides to assign a local HA, the procedure is the same as described above in association with the case where no HA is present in the home network.

The subsequent IKE (IKEv1 or IKEv2) procedure (if used) and MIPv6 procedure are the same as described in the basic solution, except that the MN 10 communicates directly with a local HA 26 instead of a HA 36 in the home network 30.

In an alternative embodiment, the MN 10 is allowed to indicate to the AAAh 34 that it prefers a local HA 26 even when it has a valid binding in a HA 36 in the home network 30. In such case the AAAh would normally instruct the HA in the home network to delete the binding before or after assigning the local HA. If the binding remains and the local HA and the HA in the home network are to be used simultaneously, additional functionality e.g. in the form of hierarchical MIPv6 is required.

Encapsulation of BU/BA packets is possible also in cases where a local HA 26 is used, provided that the required MN-local HA IPsec SAs exist. A difference from the basic solution is that the encapsulated BU/BA packets will then be transferred over path (VI+VII) instead of (IV).

Figure 9:
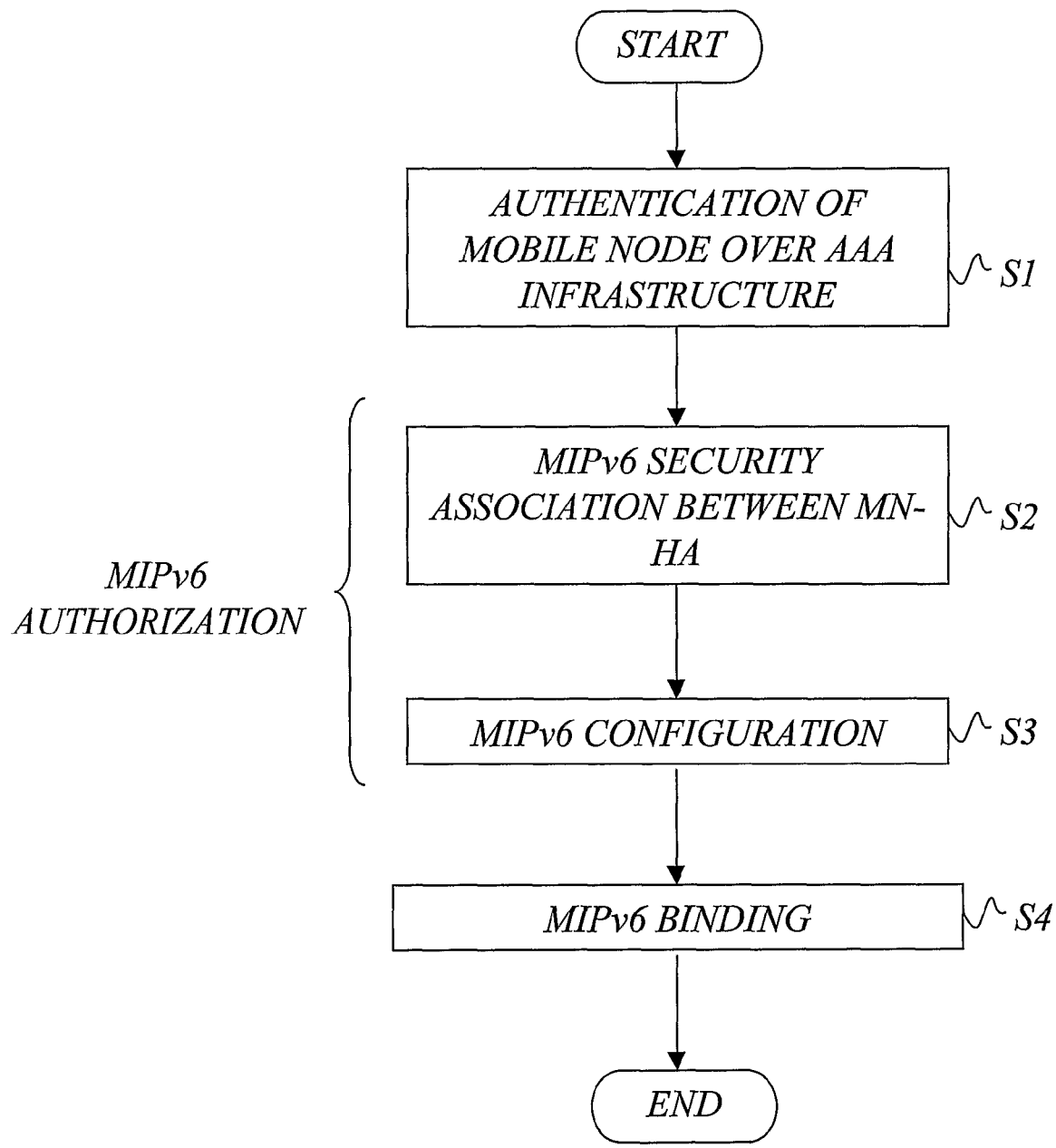
FIG. 9 is a schematic flow diagram of a basic example of a method for supporting MIPv6 service for a mobile node in accordance with the present invention.

Summarizing some of the above aspects, it can be seen that FIG. 9 is a schematic flow diagram of a basic example of a method for supporting MIPv6 service for a mobile node. In this example, the information transfer and actions indicated in steps S1-S4 relate to authentication of the mobile node (S1), establishment of MN-HA security association (S2), MIPv6 configuration (S3) and MIPv6 binding (S4). The steps S2-S3 are commonly referred to as the authorization phase. The steps S1-S4 may, if desired, be executed more or less in parallel to allow shortening of the overall setup times. In step S1, information is transferred over the AAA infrastructure for authenticating the mobile node at the home network side. In step S2, MIPv6-related information is transferred to immediately establish, or to enable future establishment of, a security association between the MN and HA. In step S3, additional MIPv6 configuration is performed, for example by transferring configuration parameters to the mobile node and/or home agent for suitable storage therein. In step S4, the mobile node sends a binding update and a MIPv6 binding is established in the HA.

Detailed exemplary embodiments of the present invention have primarily been discussed with reference to the current EAP [6, 16]. However, it should be understood that the invention very well is applicable onto other EAP versions, such as EAPv2, as well as other authentication protocols extended in the described manner. EAP is merely an example of a possible implementation, and the invention is generally not limited thereto and may alternatively involve non-EAP schemes.

In the above illustrative examples, it has been assumed that the mobile node (MN) and the AAAh have a common shared secret. This could for example be a symmetric key shared between the identity module installed in the mobile node and the home network. The identity module can be any tamper-resistant identity module known to the art, including standard SIM cards used in GSM mobile telephones, Universal SIM (USIM), WAP SIM, also known as WIM, ISIM and, more generally, UICC modules. For the MN-HA security relation, a seed or nonce can be conveyed by the MN to the AAAh (or the other way around, i.e. the seed is originated by the AAAh and conveyed to the MN) from which the AAAh can create the MN-HA security key(s), e.g. a pre-shared key, based on the shared secret. The mobile node is able to generate the same security key(s) by itself since it originated the seed/nonce (or receives the seed from the AAAh) and also has the shared secret. Alternatively the AAAh may solely generate the MN-HA security key(s) and transfer them to the MN (cryptographically protected) and the HA.

Although the invention has been described with reference to specific illustrated embodiments, it should be emphasized that it also covers equivalents to the disclosed features, as well as modifications and variants obvious to a man skilled in the art. Thus, the scope of the invention is only limited by the enclosed claims.

ABBREVIATIONS

AAA Authentication, Authorization and Accounting
AAAh Home AAA server
AAAv Visited AAA server
AKA Authentication and Key Agreement
AP Access Point
BA Binding Acknowledgement BU Binding Update
DAD Duplicate Address Detection
EAP Extensible Authentication Protocol
EP Enforcement Point
GCA Generic Container Attribute
GSM Global System for Mobile communications
HA Home Agent
IKE Internet Key Exchange
IP Internet Protocol
IPsec IP Security
ISAKMP Internet Security Association and Key Management Protocol
ISIM IM Services Identity Module
MD5 Message Digest 5
MIPv6 Mobile IP version 6
MN Mobile Node
NAI Network Access Identifier
NAS Network Access Server
PAA PANA Authentication Agent
PAC PANA Client
PANA Protocol for carrying Authentication for Network Access
PPP Point-to-Point Protocol
SA Security Association
SIM Subscriber Identity Module
SPI Security Parameter Index
TLS Transport Layer Security
TLV Type Length Value
TTLS Tunneled TLS
UICC Universal Integrated Circuit Card
WAP Wireless Application Protocol
WLAN Wireless Local Area Network

REFERENCES

[1] Mobility support in IPv6, D. Johnson, C. Perkins, J. Arkko, Jun. 30, 2003
[2] Diameter Mobile IPv6 Application, Stefano M. Faccin, Franck Le, Basavaraj Patil, Charles E. Perkins, April 2003
[3] Protocol for Carrying Authentication for Network Access (PANA), D. Forsberg, Y. Ohba, B. Patil, H. Tschofenig, A. Yegin, April 2003
[4] EAP Tunneled TLS Authentication Protocol, Paul Funk, Simon Blake-Wilson, November 2002
[5] IEEE Standard 802.1X, Local and metropolitan area networks—Port-Based Network Access Control
[6] PPP Extensible Authentication Protocol (EAP), RFC2284, L. Blunk, J. Vollbrecht, March 1998
[7] Diameter Extensible Authentication Protocol (EAP) Application, T. Hiller, G. Zom, March 2003
[8] Remote Authentication Dial In User Service (RADIUS), RFC2865, C. Rigney, S. Willens, A. Rubens, W. Simpson, June 2000
[9] RADIUS Extensions, RFC2869, C. Rigney, W. Willats, P. Calhoun, June 2000
[10] Diameter Mobile IPv4 Application, P. Calhoun, T. Johansson, C. Perkins, Apr. 29, 2003
[11] 3GPP2 X.P0011 Ver. 1.0-9, 3GPP2 Wireless IP Network Standard, February, 2003
[12] The Internet Key Exchange (IKE), RFC2409, D. Harkins, D. Carrel, November 1998
[13] Internet Security Association and Key Management Protocol (ISAKMP), RFC2408, D. Maughan, M. Schertler, M. Schneider, J. Turner, November 1998
[14] EAP AKA Authentication, J. Arkko, H. Haverinen, October 2003
[15] EAP SIM Authentication, H. Haverinen, J. Salowey, October 2003
[16] Extensible Authentication Protocol (EAP), L. Blunk, J. Vollbrecht, B. Aboba, J. Carlson, H. Levkowetz, September 2003
[17] State Machines for EAP Peer and Authenticator, J. Vollbrecht, P. Eronen, N. Petroni, Y. Ohba, October 2003
[18] MIPv6 Authorization and Configuration based on EAP, G. Giaretta, I. Guardini, E. Demaria, February 2004

The invention claimed is:
1. A method of authentication and authorization support for Mobile IP version 6 (MIPv6), comprising the steps of:
   encrypting Extensible Authentication Protocol (EAP) authentication and authorization information in a mobile device operating in a visited network;
   sending the encrypted EAP authentication and authorization information from the mobile device to a pass-through visited Authentication, Authorization, and Accounting (AAA) client in the visited network utilizing a protocol for carrying authentication information for network access;
   forwarding the encrypted EAP authentication and authorization information from the pass-through visited AAA client to a pass-through visited AAA server in the visited network;
   forwarding the encrypted EAP authentication and authorization information from the pass-through visited AAA server in the visited network to a home AAA server in the mobile device's home network;
   performing an analysis of the encrypted EAP authentication and authorization information by the home AAA server;
   sending a MIPv6-related challenge message from the home AAA server to the mobile device via the pass-through visited AAA server and the pass-through visited AAA client in the visited network based on the analysis of the encrypted EAP authentication and authorization information;
   sending a MIPv6-related challenge response message from the mobile device to the home AAA server via the pass-through visited AAA client and the pass-through visited AAA server in the visited network;
   performing an analysis of the challenge response message contents by the home AAA server; and
   sending a MIPv6-related authentication and authorization results message from the home AAA server to the mobile device reporting a result of the analysis of the challenge response message contents and providing session parameter information;
   wherein the pass-through visited AAA client and the pass-through visited AAA server forward all messages in a pass-through manner in which information within Type and Type-Data fields after EAP layer headers is not examined by the pass-through visited AAA client and the pass-through visited AAA server;
   whereby prior EAP encryption is applied between the mobile device and the home AAA server.
2. The method of claim 1, further comprising transferring MIPv6-related information from the home AAA server in the home network to a home agent.
3. The method of claim 2, wherein the MIPv6-related information is transferred from the home AAA server in the home network to the home agent in an AAA framework protocol application.
4. The method of claim 3, wherein the home agent is a local home agent in the visited network and the MIPv6-related information is transferred from the home AAA server to the local home agent via the visited AAA server in the visited network.

5. The method of claim 3, wherein the AAA framework protocol application is an application of a protocol selected from the group of Diameter and RADIUS.

6. The method of claim 2, further comprising
assigning, by the home AAA server, a home agent to the mobile device; and
distributing by the home AAA server to the mobile device and the home agent, credential-related data for establishing a security association between the mobile device and the home agent.

7. The method of claim 6, further comprising
building, at the mobile device, a home address for the mobile device using at least a portion of the address of its assigned home agent; and
transferring the home address of the mobile device from the mobile device to the home AAA server in the home network using a round trip of a selected EAP procedure.

8. The method of claim 1, wherein the MIPv6-related challenge and response messages are incorporated as additional data in an EAP protocol stack.

9. The method of claim 8, wherein MIPv6-related information is transferred in at least one EAP attribute in the EAP protocol stack.

10. The method of claim 9, wherein the MIPv6-related information is transferred as EAP attributes of the EAP method layer in the EAP protocol stack.

11. The method of claim 10, wherein the EAP attributes are EAP Type-Length-Value (TLV) attributes.

12. The method of claim 9, wherein the MIPv6-related information is transferred in a generic container attribute available for any EAP method.

13. The method of claim 9, wherein the MIPv6-related information is transferred in a method-specific generic container attribute of the EAP method layer in the EAP protocol stack.

14. The method of claim 1, wherein the protocol for carrying authentication information for network access is selected from the group of the Protocol for carrying Authentication for Network Access (PANA), IEEE 802.1x, and Point-to-Point Protocol (PPP).

15. A system for authentication and authorization support for Mobile IP version 6 (MIPv6), comprising a mobile device operating in a visited network, a pass-through Authentication, Authorization, and Accounting (AAA) visited client in the visited network, a pass-through visited AAA server in the visited network, and a home AAA server in the mobile device's home network, wherein the system performs the steps of:
the mobile device encrypting Extensible Authentication Protocol (EAP) authentication and authorization information;
the mobile device sending the encrypted EAP authentication and authorization information to the pass-through visited AAA client in the visited network utilizing a protocol for carrying authentication information for network access;
the pass-through visited AAA client forwarding the encrypted EAP authentication and authorization information to the pass-through visited AAA server in the visited network;
the pass-through visited AAA server forwarding the encrypted EAP authentication and authorization information to the home AAA server in the mobile device's home network;
the home AAA server performing an analysis of the encrypted EAP authentication and authorization information;
the home AAA server sending a MIPv6-related challenge message to the mobile device via the pass-through visited AAA server and the pass-through visited AAA client in the visited network based on the analysis of the encrypted EAP authentication and authorization information;
the mobile device sending a MIPv6-related challenge response message to the home AAA server via the pass-through visited AAA client and the pass-through visited AAA server in the visited network;
the home AAA server performing an analysis of the challenge response message contents; and
the home AAA server sending a MIPv6-related authentication and authorization results message to the mobile device reporting a result of the analysis of the challenge response message contents and providing session parameter information;
wherein the pass-through visited AAA client and the pass-through visited AAA server forward all messages in a pass-through manner in which information within Type and Type-Data fields after EAP layer headers is not examined by the pass-through visited AAA client and the pass-through visited AAA server;
whereby prior EAP encryption is applied between the mobile device and the home AAA server.

16. The system of claim 15, wherein the MIPv6-related challenge and response messages are incorporated as additional data in an EAP protocol stack.

17. The system of claim 16, wherein MIPv6-related information is carried in at least one EAP attribute in the EAP protocol stack.

18. The system of claim 17, wherein the MIPv6-related information is carried in EAP attributes of the EAP method layer in the EAP protocol stack.

19. The system of claim 18, wherein the EAP attributes are EAP Type-Length-Value (TLV) attributes.

20. The system of claim 17, wherein the MIPv6-related information is carried in a generic container attribute available for any EAP method.

21. The system of claim 17, wherein the MIPv6-related information is carried in a method-specific generic container attribute of the EAP method layer in the EAP protocol stack.

22. The system of claim 15, wherein the protocol for carrying authentication information for network access is selected from the group of the Protocol for carrying Authentication for Network Access (PANA), IEEE 802.1x, and Point-to-Point Protocol (PPP).

23. The system of claim 15, wherein MIPv6-related information is transferred from the home AAA server in the home network to a home agent in an AAA framework protocol application.

24. The system of claim 23, wherein the home agent is a local home agent in the visited network and the MIPv6-related information is transferred from the home AAA server to the local home agent via the visited AAA server in the visited network.

25. The system of claim 24, wherein the AAA framework protocol application is an application of a protocol selected from the group of Diameter and RADIUS.

* * * * *

UNITED STATES PATENT AND TRADEMARK OFFICE
CERTIFICATE OF CORRECTION

PATENT NO. : 7,934,094 B2
APPLICATION NO. : 10/595019
DATED : April 26, 2011
INVENTOR(S) : Oyama It is certified that error appears in the above-identified patent and that said Letters Patent is hereby corrected as shown below:

On the title page, item (12), under "UNITED STATES PATENT", in Column 1, Line 1, delete "Oyama" and insert -- Oyama et al. --, therefor.

On the title page, item (75), in Column 1, Line 1, delete "Inventor:" and insert -- Inventors: --, therefor.

On the title page, item (75), under "Inventor", in Column 1, insert Second Inventor -- Ryoji Kato, Kanagawa (JP) --, therefor.

On the title page, item (75), under "Inventor", in Column 1, insert Third Inventor -- Johan Rune, Stockholm (SW) --, therefor.

On the title page, item (75), under "Inventor", in Column 1, insert Fourth Inventor -- Tony Larsson, Stockholm (SW) --, therefor.

In Fig. 2, Sheet 2 of 8, in Line 8, delete "dentitiy" and insert -- identity --, therefor.

In Fig. 3, Sheet 3 of 8, in Line 8, delete "dentitiy" and insert -- identity --, therefor.

In Fig. 4, Sheet 4 of 8, in Line 8, delete "dentitiy" and insert -- identity --, therefor.

In Column 7, Line 14, delete "HA-MNPre-shared" and insert -- HA-MN Pre-shared --, therefor.

In Column 7, Line 15, delete "HA-MN-IPSec" and insert -- HA-MN IPSec --, therefor.

In Column 9, Line 27, delete "AAAH" and insert -- AAAh --, therefor.

In Column 13, Line 5, delete "AAAH" and insert -- AAAh --, therefor.

Signed and Sealed this
Eighth Day of November, 2011

David J. Kappos
*Director of the United States Patent and Trademark Office*

CERTIFICATE OF CORRECTION (continued)
U.S. Pat. No. 7,934,094 B2

In Column 16, Lines 37-38, delete "AAAv→AAAh" and insert -- AAAv↔AAAh --, therefor.

In Column 17, Line 20, delete "AAAH" and insert -- AAAh --, therefor.

In Column 19, Line 51, delete "Zom," and insert -- Zorn, --, therefor.